United States Patent Office 3,499,969
Patented Mar. 10, 1970

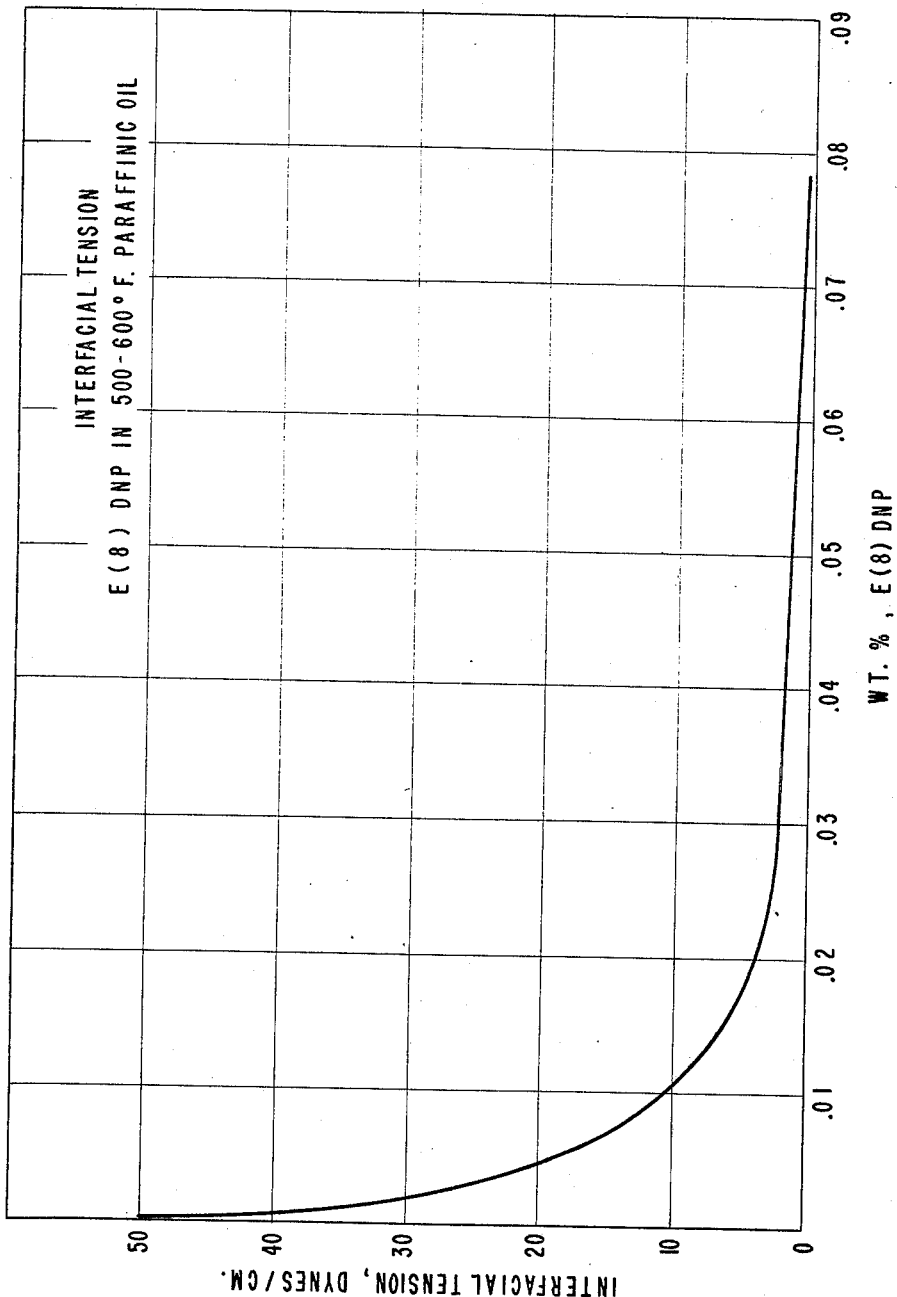

3,499,969
MOSQUITO CONTROL OIL PROMOTED WITH POLYETHOXYLATED 2,4-DINONYL PHENOL AND METHOD OF USING IT
Gilbert V. Chambers, 706 Idlewood,
Baytown, Tex. 77520
Continuation-in-part of application Ser. No. 604,790, Dec. 27, 1966. This application July 17, 1967, Ser. No. 653,659
Int. Cl. A01n 9/24, 9/02, 9/04
U.S. Cl. 424—341          25 Claims

ABSTRACT OF THE DISCLOSURE

The effectiveness of mosquito control oils is enhanced by the inclusion of at least about 0.2 weight percent (and up to an upper limit of about 3.75 weight percent) of a promoter, ethoxylated 2,4-dinonyl phenol, wherein the ethoxylated substituent contains from about 6 to about 14 ethoxy units.

CROSS-REFERENCE TO RELATED APPLICATION

This application is a continuation-in-part of copending application Ser. No. 604,790, filed Dec. 27, 1966, now abandoned.

BACKGROUND OF THE INVENTION

Field of the invention

This invention pertains to the killing of aquatic stages of insects by application of an oily material to the surface of the aquatic breeding grounds of the insect.

Description of the prior art

The prior art has utilized hydrocarbon oils such as diesel fuel as a surface-applied insecticide for killing aquatic stages of insect life. However, it has been necessary to use about 20 gallons per acre as a treat rate. In an attempt to avoid the high cost of application with such a high application rate of the diesel fuel, chemical insecticides have been used instead of diesel fuel. However, this is also expensive and has not been particularly effective due to the rapid development of resistant strains in the mosquito population. Addition of surfactants also has been tried, but the effect of the surfactant has merely been that the oil has spread more evenly across the pond surface, thereby increasing the chance that the mosquito larvae and pupae would come in contact with the oil. The effectiveness of the oil as a toxic material per se has not been affected.

SUMMARY OF THE INVENTION

The present invention relates to a promoted oil having toxicity towards the aquatic stages of insect life, particularly the larvae and pupae of mosquitoes. More particularly, the present invention relates to a novel mixture of materials whereby an oil, having a toxicity towards mosquito larvae and pupae, is enhanced manyfold in its toxicity and effectiveness, allowing the use of much smaller treat rates when applying the oil to the surface of breeding ponds. In its most specific aspect, the present invention relates to a mixture of a mosquito oil with a promoter, ethoxylated 2,4-dinonyl phenol, which is used in effective amounts of at least 0.2 weight percent of the mixture, and a method of using this promoted mixture in the control of mosquito proliferation.

BRIEF DESCRIPTION OF THE DRAWING

The sole figure is a graph showing the relationship between interfacial tension and the quantity of ethoxylated 2,4-dinonyl phenol in a 500–600° F. paraffinic oil.

DESCRIPTION OF THE PREFERRED EMBODIMENTS

Mosquitoes are well known as carriers of such pathogens as the encephalitis virus and malaria bacteria. It is essential in preventing diseases caused by such pathogens to control the proliferation of the mosquito carriers of the pathogen. This can best be accomplished by breaking the mosquito life cycle rather than by attacking the adult mosquito itself.

The mosquito in its life cycle passed through three stages before obtaining maturity: egg, larva, and pupa. The most effective way of controlling mosquito proliferation is by breaking the life cycle; i.e., by attacking the proliferating mosquitoes before they reach maturity. Since the early stages of mosquito development are aquatic, the means chosen to break the life cycle must be adapted to kill the immature mosquito while it is in the water.

Heretofore the use of oils for covering the surface of mosquito breeding ponds has not been too effective unless used in high concentrations. For example, No. 2 diesel oil is applied in amounts ranging from 20 to 40 gallons per acre of surface. This is uneconomical. The present invention provides promoted oil which, by use of a very small amount of a relatively cheap material, enhances manyfold the toxicity of the oil itself, and the mixture can be used effectively in amounts as low as one gallon per acre of water surface.

The present invention, although encompassing the admixture of the promoter with diesel oil, is most valuable in allowing the use of more expensive and more effective oils for mosquito control, rather than the diesel fuel. Further, since the amount of oil that is to be applied can be reduced to a very small level, the use of the cheaper diesel fuel can be enhanced in its effectiveness.

The present invention involves the use of ethoxylated 2,4-dinonyl phenol as a promoter for oils which already have a toxicity toward the aquatic stages of mosquito life. The ethoxylated 2,4-dinonyl phenol is not itself toxic toward mosquito life and does not render toxic those oils which are not in themselves toxic (for example, heavy paraffinic oils boiling above about 750° F.). The precise role of the promoter is not known, but by inspection of the larvae, it has been concluded that the promoter is effective because of changes which occur within the organism itself, and not merely in enhancing the spreadability of the oil on the water surface (i.e., acting as a surfactant). A number of other surfactants have been checked, and no other surfactant has been found to give the same effect as the ethoxylated dinonyl phenol. Some of these other surfactants are ethoxylated nonyl phenols (9 species) and ethoxylated octyl phenols (5 species) with various numbers of ethoxy units in the substituent; ethoxylated amines (2 species); ethoxylated fatty acids (2 species); and 9 other ethoxylated materials.

The present invention can best be understood by a discussion of each of the aspects in sequence. Thus, hereinbelow will be discussed the specifics of the ethoxylated dinonyl phenol, including the method of preparation and a comparison with other surfactants, the amount of promoter which should be included, the hydrocarbon oils which can be used in connection with the promoter, and the methods of applying the promoted oil for the control of proliferating mosquitoes.

Promoter

As has been stated, the promoter of the present invention is an ethoxylated 2,4-dinonyl phenol. This compound is a surfactant, but its activity in the present mixtures appears to involve toxic effects of the mixture on the mosquito larvae and pupae themselves, rather than merely enhancing the spreadability of the hydrocarbon oil.

The promoter of the present invention has the following structural formula:

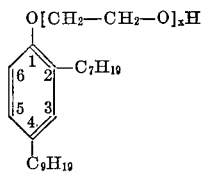

2,4-dinonyl phenoxy polyethoxy ethanol (referred to herein as polyethoxylated dinonylphenol)

In the above formula, $x$ is the number of ethoxy units in the ethoxylated substituent. From 6 to 14 units (average) will be present in the ethoxylated substituent, so that $x$ can be from 6 to 14.

The number of ethoxy units in the ethoxylated substituent is determined by Nuclear Magnetic Resonance (NMR) analysis wherein the amounts of the alkyl, aromatic, ethoxy and hydroxy hydrogens are measured. One third of the aromatic hydrogen measurement should be equal to one thirty-eighth of the alkyl hydrogen measurement. This provides an internal calibration factor (F) for determining the ethoxy chain length. First, the ethoxy hydrogen measurement is divided by the factor F, thereby obtaining the number of ethoxy hydrogens. The number of ethoxy hydrogens divided by 4 gives the average number of ethoxy units in the molecule.

An ethoxylated 2,4-dinonyl phenol is prepared by the liquid phase ethoxylation of 2,4-dinonyl phenol:

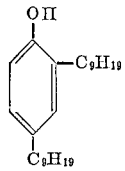

In this process, a liquid-phase charge of preferably 85%+ pure dinonyl phenol and up to 0.2% NaOH by weight (based on the amount of dinonyl phenol) is placed in a pressure reactor, and is raised to a temperature of about 260 to 300° F. Gaseous ethylene oxide is bubbled into the reaction zone, wherein an exothermic reaction takes place between the ethylene oxide and the dinonyl phenol. The rate of addition is controlled to maintain a temperature of about 320 to 340° F. From 6 to 14 mols of ethylene oxide per mol of dinonyl phenol are introduced and reacted. The average number of ethoxy units in the ethoxylated substituent can be fairly closely controlled by the ratio of ethylene oxide to dinonyl phenol introduced into the reaction zone.

The reaction is preferably carried out generally at a temperature within the range of 320 to 340° F., and a pressure from atmospheric to 30 p.s.i.g. The ratio of ethylene oxide to phenol is preferably 8 to 11 mols of ethylene oxide per mol of dinonyl phenol. The process is preferably carried out in a semibatch process, with the ethylene oxide being continuously introduced at a controlled rate into a batch reactor. Conditions are preferably controlled so that there is no ethylene oxide in the exhaust gas (i.e., all of the ethylene oxide is reacted). Exemplary products may have the following physical characteristics:

TABLE I

| Ethoxylated product: Average number of ethoxy units | Specific gravity at 77° F. | Viscosity at 77° F., centistokes |
|---|---|---|
| 11 | 1.0164 | 384 |
| 8 | .9703 | 382 |

The ethoxylated dinonyl phenol is very effective in promoting the toxic effects of mosquito control oils. This same effect has not been noted with other surfactants.

In Table II below, EODP(8) is compared with exemplary other surface active agents. Note that the use of EODP(8) alone, without an oil, did not produce any appreciable mortality in the test larvae.

TABLE II

| Description of material | Interfacial tension, dynes/cm. | Percent mortality, 24 hrs. exposure larvae | | |
|---|---|---|---|---|
| | | 1.25* | 2.5* | 5.0* |
| 500–600° F. paraffinic oil | 50.0 | | 53 | 65 |
| 500–600° F. paraffinic oil with 0.5 wt. percent ethoxylated (5) octyl phenol | 2.2 | | 36 | 80 |
| 500–600° F. paraffinic oil with 0.1875 wt. percent EODP (8) [2] | ~1 | 45 | 67 | |
| 500–600° F. paraffinic oil with 0.375 wt. percent EODP (8) [2] | ~1 | 100 | 100 | |
| 500–600° F. paraffinic oil with 0.5 wt. percent ethoxylated oleic acid having 10 ethoxy units | 2.5 | 36 | 69 | |
| EODP (8) [2] | | | 1 | 0 |

[1] Gallons per acre.
[2] EODP (8) is ethoxylated 2,4-dinonyl phenol having 8 ethoxy units (average).

Note that the toxic activity of the paraffinic oil was substantially enhanced by employing the promoter of the present invention; whereas the use of ethoxylated (5) octyl phenol (Triton X45, commonly used in 0.25 weight percent combination with diesel fuel for mosquito control) showed no perceptible increase in activity at the low treat rate, nor did the use of ethoxylated (10) oleic acid, although the number of ethoxy units is within the range employed in the present invention.

The purity of the 2,4-dinonyl phenol feedstock into the ethoxylation reaction zone should be at least 85%, resulting in a product purity of at least 85%. The main impurity will normally be nonyl phenol, which can itself be ethoxylated to produce a surface active agent which appears to interfere with the activity of the promoter of the present invention. As will be discussed hereinafter, solubilizers such as aromatic hydrocarbons (and especially dinonyl phenol) as well as surface active agents tend to reduce the effectiveness of the promoter, requiring the use of higher concentration of promoter in the oil or a higher oil treat rate, or both. With up to about 10 weight percent impurities in the product, the impurities act primarily as diluents. (The concentration of EODP is always calculated on an impurity-free basis.) Above 15 weight percent, however, deleterious effects are observable and this 15% limit preferably should not be exceeded.

To illustrate the deleterious effect of other surface active agents (particularly, the ethoxylated nonyl phenol, mortality studies were made with a 500–600° F. paraffinic oil containing 1 weight percent EODP (8.7), and companion runs to which were added one or two additional 0.25 weight percent increments of EONP (8).

TABLE III

| Description of material | 24-hr. larvae mortality | |
|---|---|---|
| | 0.5 gal./a. | 1.0 gal./a. |
| 500–600° F. paraffinic oil with 1 wt. percent EODP (8.7) [1] | 87 | 99 |
| 500–600° F. paraffinic oil with 1 wt. percent EODP (8.7) and 0.25 wt. percent EONP (8) [2] | 13 | 84 |
| 500–600° F. paraffinic oil with 1 wt. percent EODP (8.7) and 0.50 wt. percent EONP (8) [2] | | 41 |

[1] EODP (8.7) is ethoxylated 2,4-dinonyl phenol containing an average of 8.7 ethoxy units per molecule.
[2] EONP (8) is ethoxylated nonyl phenol containing an average of 8 ethoxy units per molecule.

Note that the addition of ethoxylated nonyl phenol reduced the effectiveness of the promoter from 99% to 84% to 41%. This is not a dilution effect since the amount of EODP (8.7) is not reduced. Thus, high purity dinonyl phenol is to be preferred.

The promoter of the present invention can be utilized in varying concentrations. As has been seen from Table IV below, the use of at least 0.1875 weight percent is required before any effect is seen.

TABLE IV.—RELATION OF TOXICITY OF AN OIL [1] WITH ETHYLOXYLATED DINONYL PHENOL AT VARIOUS CONCENTRATION LEVELS

| Concentration of EODP, wt. percent | Interfacial tension, dynes/cm. | Percent mortality, 24-hr. exposure | | | |
|---|---|---|---|---|---|
| | | Larvae | | Pupae | |
| | | 1.25 (gal./a.) | 2.5 (gal./a.) | 1.25 (gal./a.) | 2.5 (gal./a.) |
| None | 50 | | 55 | 4 | 56 |
| 0.0750 | ~1 | 21 | 65 | 64 | 87 |
| 0.1875 | ~1 | 45 | 67 | 87 | 99 |
| 0.3750 | ~1 | 100 | 100 | 92 | 97 |
| 0.7500 | ~1 | 100 | 100 | 100 | 96 |
| 1.8750 | ~1 | 100 | 100 | 100 | 95 |
| 3.7500 | ~1 | 100 | 100 | 100 | 99 |

[1] 500–600° F. paraffinic oil.

As the treat rate decreases, the required concentration at which the effectiveness increases sharply has been found to be higher than that required at higher treat rates. For example, at 1.0 gallon per acre treat rate, the oil of Table IV should contain 0.75 weight percent EODP if a 24-hour mortality rate higher than 90% is desired. Preferably, about 0.375 weight percent is employed in the mixture, since at this point the spread rate of one gallon per acre shows essentially a 100% mortality in both larvae and pupae. It is believed that a concentration of 1.0% would represent an upper economic limit, although the use of higher concentrations (e.g., 3.75 weight percent) is technically feasible although prohibitively costly. The presence of aromatic hydrocarbons, solubilizers such as nonyl phenol, and other surfactants will require the use of greater than normal amounts of EODP.

Ethoxylated 2,4-dinonyl phenol is very effective in reducing interfacial tension. As seen in FIG. 1, 0.03 weight percent reduces the interfacial tension to about 2 dynes/cm. From 0 to 0.03 weight percent concentration provides the most striking reduction in interfacial tension, and the spreadibility of the hydrocarbon oil would be most substantially benefitted in this range. As has been seen in Table IV, however, use of 0.1875 weight percent ethoxylated (8) 2,4-dinonyl phenol (preferably about 0.375) is required before a substantial effect is seen on the larvae. This concentration is substantially above the level of 0.03 weight percent which is seen to substantially modify interfacial tension and illustrates that this invention is not merely related to spreadability of the hydrocarbon on the water surface. However, in view of the deleterious effects of other surfactants, solubilizers, and aromatic hydrocarbons, it is believed that the presence and activity of the promoter at the oil/water interface is important.

The amount of the promoted oil mixture which is used can also be a function of the number of ethoxy groups in the ethoxylated substituent. This can be seen in Table V below which compares the effectiveness at 0.5 weight percent concentrations of 2,4-dinonyl phenols having different average numbers of ethoxy units in the ethoxylated substituent.

TABLE V

| Average number of ethoxy units on 2,4-dinonyl phenol | Percent mortality, 24-hr. exposure, gal./acre | | | | | | | |
|---|---|---|---|---|---|---|---|---|
| | Larvae | | | | | Pupae | | |
| | 1.0 | 1.25 | 1.5 | 2.5 | 5.0 | 1.25 | 2.5 | 5.0 |
| 0 | | | | 23 | 67 | 67 | 99 | 100 |
| 5.6 | | 47 | | 73 | | 93 | 93 | |
| 8.0 | | 60 | | 99 | | | 100 | 93 |
| 11.0 | | 95 | | 97 | | 100 | 91 | |
| 14.0 | 16 | | 59 | | | | | |

Note.—Promoter is used in 0.5 weight percent concentration in a 500–600° F. paraffinic oil.

From Table V it is seen that at 5.6 units (average) per molecule, a certain amount of effectiveness is provided. However, at an average of 8 and 11 units per molecule, a much greater effect on the larvae is seen, and therefore the range of 8 to 11 units (possibly higher) is preferred. Note that even at 5.6 units per molecule, the toxicity to pupae is enhanced so that essentially the same effectiveness is obtained at 1.25 gallons per acre as is accomplished by an oil promoted with 2,4-dinonyl phenol and applied at twice that rate (2.5 gal./acre). Also note that at 14 units per molecule, the larvae toxicity is beginning to decrease rapidly.

Suitable oils

The promoter of the present invention may be used with a number of hydrocarbon oils which themselves have toxicity for the aquatic stages of mosquito life. In general, these oils will boil within the range of 500 to 800° F., and may include paraffinic oils, alkylate oils, diesel fuel, and $C_{15}$ to $C_{16}$ paraffins, preferably having a midpoint below 650° F. The preferred boiling range is from 500 to 725° F., and the preferred oil will be in the higher regions in this range, e.g., 550–650° F. A suitable, economically available oil, however, may be a paraffinic oil boiling from 500 to 600° F. A midpoint of 650° F. or less is preferred (Table VII).

Examples of suitable oils are shown below, with an example of each type being given along with the inspection data. An aromatic oil is shown for comparison, to illustrate the deleterious effect of aromatics. Other aromatic oils which have been evaluated show similar results. See Table VIII, for example.

TABLE VI

| Suitable oils | Amount of ethoxylated (8) dinonyl phenol added, wt. percent | Percent mortality 24-hr. exposure | | | | | |
|---|---|---|---|---|---|---|---|
| | | Larvae | | | Pupae | | |
| | | 1.25 [1] | 2.5 [1] | 5.0 [1] | 1.25 [1] | 2.5 [1] | 5.0 [1] |
| Paraffinic oil (1) | None | | 53 | 65 | | 56 | 64 |
| Paraffinic oil | 0.375 | 100 | 100 | | 92 | 93 | 98 |
| Alkylate oil (3) | None | | 36 | 68 | 77 | 99 | |
| Alkylate oil | 0.375 | 100 | 100 | | 100 | 100 | |
| Diesel fuel (5) | None | 11 | 19 | 60 | 32 | 83 | 97 |
| Diesel fuel | 0.375 | 97 | 100 | | 92 | 99 | 100 |
| N-C16 Paraffin (7) | None | | | 71 | | 100 | 93 |
| N-C16 Paraffin | 0.375 | 92 | 100 | | 100 | 100 | |
| Aromatic Oil (9) | None | | | 67 | | | 33 |
| Aromatic Oil | 0.375 | | 28 | 59 | | 21 | |

| Inspection | Inspection data (oil) | | | | |
|---|---|---|---|---|---|
| | 1 | 3 | 5 | 7 | 9 |
| Mid-boiling pt. °F | 572 | 542 | 515 | 548 | 585 |
| 95–5% boiling range, °F | 65 | 120 | 160 | | 70 |
| Distillation data, ASTM D-86: | | | | | |
| IBP, °F | 508 | 433 | 401 | | 544 |
| 5 | 535 | 499 | 444 | | 560 |
| 50 | 572 | 542 | 515 | 548 | 585 |
| 95 | 599 | 620 | 604 | | 730 (93.5%) |
| FBP | 609 | 620 | 625 | | 90 |
| Aromatics, vol. percent | 12 | [2] 3.0 | 24 | 0.0 | 90 |
| API gravity | 31.5 | 41.2 | 36.5 | | 16.6 |
| Viscosity, SSU at 100° F | 50 | | | | |

[1] Gallons per acre.
[2] Weight percent.

Note that the promoter of the present invention is effective on a wide range of oil types and is particularly effective in enhancing the toxicity of paraffinic oils. The higher boiling oils are not desirable since some of them do not possess the requisite toxicity. Thus, the midpoint should be less than 650° F. as shown below in Table VII.

TABLE VII

| Oil | Unsulfonated residue, percent | Midpoint ° F. | SSU 100° F. | Culex fatigans, Larvae percent mortality | | | |
|---|---|---|---|---|---|---|---|
| | | | | 1.0 (gal./a.) | 1.25 (gal./a.) | 1.5 (gal./a.) | 2.5 (gal./a.) |
| A [1] | 91 | 572 | 42 | 93 | 94 | 93 | 100 |
| B [2] | | 576 | | 99 | | | |
| C [3] | | 580 | | 97 | | | |
| D [4] | 90+ | 542 | | | 100 | | |
| E [5] | 90+ | 594 | 94 | 100 | | | |
| F [5] | 90+ | 623 | 164 | 91 | | | |
| G [5] | 90+ | 623+ | 1024 | 85 | | | |
| H [6] | 95 | 643 | 49.5 | 92 | | | 100 |
| I [6] | 96 | 647 | 50.5 | 76 | | | 100 |
| J [6] | 100 | 681 | 59.4 | 15 | | 23 | 59 |
| K [6] | 95 | 684 | 76.3 | 4 | | 25 | 61 |
| L [6] | 96 | 719 | 74.0 | | 21 | | 41 |

[1] Same as oil (1) in Table VI.
[2] Oil (1) with low 20% cut removed.
[3] Oil (1) with low 40% cut removed.
[4] Same as oil (3) in Table VI.
[5] E, F and G are higher-boiling cuts of an oil similar to oil (3).
[6] H, I, J, K and L are 50–70 vis lube stocks.
All oils contained 1 wt. percent EODP (8) except D, which contained 0.5 wt. percent.

In Table VII note that at a treat rate of one gal./acre, a drop-off in effectiveness occurs at about 650° F. midpoint; at 681° F., even a treat rate of 2.5 gal./acre shows a pronounced drop-off in effectiveness. Thus, a midpoint less than 650° F. is preferred.

The deleterious effect of aromatic hydrocarbons has been mentioned. This is shown in Table VIII below.

TABLE VIII.—24-Hr. Mortality, C. fatigans Larvae, Oil Containing 1 Wt. Percent EODP (8)

| Hexadecane vol. percent | HAN [1] vol. percent | Aromatic content, vol. percent | Gal./acre | | | |
|---|---|---|---|---|---|---|
| | | | 0.75 | 1.0 | 1.25 | 1.5 |
| 100 | 0 | 0 | 87 | 95 | 97 | 100 |
| 90 | 10 | 9 | 45 | 96 | 95 | 97 |
| 80 | 20 | 18 | 23 | 91 | 89 | 89 |
| 70 | 30 | 27 | 8 | 85 | 71 | 83 |
| 60 | 40 | 36 | | 41 | 73 | 76 |
| 50 | 50 | 45 | | 49 | 69 | 64 |
| 40 | 60 | 54 | | | 71 | |
| 30 | 70 | 63 | | | 57 | |
| 20 | 80 | 72 | | | 35 | |
| 10 | 90 | 81 | | | 12 | |
| 0 | 100 | 90 | | | 5 | |

[1] HAN is a heavy aromatic naphtha boiling from 360 to 530° F. with a 20.1 API gravity and a 90% aromatic content. Hexadecane boils at 548° F.

Note from Table VIII that an increasing aromatic content decreased the effectiveness of the promoted oil. It is believed that this is due to the solubilizing effect of the aromatic hydrocarbons, which disturbs in some way not known the activity of the EODP at the oil-water interface. From Table VIII it appears that the oil should contain at least 60% saturated hydrocarbon at higher treat rates, and at least 80% for treat rates of about 1.0 gal./acre, if 90%+ mortality is desired.

The mixture of oil and promoter can be applied to the surface of breeding ponds in a number of different ways. It can obviously be poured as a liquid mixture directly onto the surface of the ponds or can be sprayed on the surface of the ponds by devices carried by hand, mounted on trucks, or carried by aerial applicators such as airplanes and helicopters. Submerged tanks may be employed which discharge the oil slowly for maintaining an effective oil layer on the surface. In many cases, the equipment available for applying the oil to the surface of the ponds is not capable of metering out the small quantities at which the present mixture is effective. Although not economically attractive, it is possible to use diluent oils (such as kerosene) to provide bulk for application. The promoted oil should be applied at a rate of at least one gallon per acre, preferably within the range from 1 to 3 gallons of the promoted oil mixture per acre (for the purpose of determining the application rate, where a diluted oil mixture is applied, the diluent oil is not counted as part of the oil being applied to the water surface). The upper limit of the application rate is based upon economics and would be probably about 10 gallons per acre; although in some circumstances, it may be economic to apply even greater quantities.

As is seen below in the table, the volatility of the oil influences the effectiveness of the mixture.

TABLE IX.—Residual Toxicity to C. fatigans Larvae

| Material | IBP (° F.) | Percent mortality, 5 gal./a. dosage | | | | | | | |
|---|---|---|---|---|---|---|---|---|---|
| | | 0 [1] | 1 [1] | 2 [1] | 3 [1] | 4 [1] | 5 [1] | 6 [1] | 7 [1] |
| A. Paraffinic oil with 0.5 wt. percent EODP (8) | 500 | 100 | 100 | 100 | 83 | 68 | 33 | 28 | 0 |
| B. Diesel fuel with 0.5 wt. percent EODP (8) | 400 | 100 | 100 | 8 | | | | | |
| C. Diesel fuel | 400 | 29 | 1 | | | | | | |

[1] Age of the film in days before addition of test animals.

Table IX shows that, as the volatile components of the oil are lost with time, the effectiveness is decreased. Thus, the use of higher boiling oil fractions (that are toxic in themselves) are preferred for more effective control. New eggs hatch in 2 to 3 days, thus the lasting effectiveness of the oil is beneficial.

The data tabulated above was obtained by the following experimental procedure. Beakers (400 ml. capacity and 7.4 cm. internal diameter) containing 250 ml. of distilled water were used for all tests. The test animals were laboratory specimens of C. fatigans selected at random from pools of larvae or pupae representing combined rearing pans. Twenty-five fourth instar larvae or pupae were used per beaker. Untreated and diesel oil controls were included in each test.

To test toxicity, the larvae (or pupae) were placed in each beaker, following which 0.005 ml., 0.01 ml. or 0.02 ml. of oil was dropped on the water surface with a pipette. These quantities represent a rate of 1.25 gal./acre, 2.5 gal./acre and 5.0 gal./acre, respectively. Twenty-four hours later the number of living and dead specimens was recorded and the percent mortality determined. This test was conducted in triplicate, with 25 specimens being used per replicate.

To establish the residual effectiveness of the promoted oils, the following tests were made. The oils were pipetted onto the surface of water in beakers at the rate of 5 gallons per acre and C. fatigans larvae were introduced into the separate beakers at various times up to 7 days after the oil was deposited on the water surface, and the 24-hour toxicity was observed.

I claim:
1. A mosquito control oil consisting essentially of
  (a) a hydrocarbon oil boiling substantially within the range from 500° F. to 800° F. and having a midpoint no greater than 650° F., containing at least 60% saturated hydrocarbons, and having a toxicity toward immature mosquitoes, and

(b) from about 0.2 weight percent to about 3.75 weight percent concentration of polyethoxylated 2,4-dinonyl phenol which contains an average of from about 6 to about 14 ethoxy units in the ethoxylated substituent.

2. A mosquito control oil in accordance with claim 1 wherein the hydrocarbon oil contains at least 80% saturated hydrocarbons.

3. A mosquito control oil in accordance with claim 1 wherein the polyethoxylated 2,4-dinonyl phenol is present in a concentration from about 0.2 weight percent to about 1.0 weight percent.

4. A mosquito control oil in accordance with claim 1 wherein the polyethoxylated 2,4-dinonyl phenol is present in a concentration of about 0.75 weight percent.

5. A mosquito control oil in accordance with claim 1 wherein the hydrocarbon oil contains at least 90% saturated hydrocarbons.

6. A mosquito control oil in accordance with claim 1 wherein the hydrocarbon oil boils substantially within the range from about 500° F. to about 600° F.

7. A mosquito control oil in accordance with claim 6 wherein the hydrocarbon oil contains at least 80% saturated hydrocarbons.

8. A mosquito control oil in accordance with claim 6 wherein the hydrocarbon oil contains at least 90% saturated hydrocarbons.

9. A mosquito control oil in accordance with claim 1 wherein the hydrocarbon oil boils substantially within the range from about 550° F. to about 650° F.

10. A mosquito control oil in accordance with claim 9 wherein the hydrocarbon oil contains at least 80% saturated hydrocarbons.

11. A mosquito control oil in accordance with claim 9 wherein the hydrocarbon oil contains at least 90% saturated hydrocarbons.

12. A mosquito control oil in accordance with claim 9 wherein the polyethoxylated 2,4-dinonyl phenol contains from 8 to 11 ethoxy units.

13. A mosquito control oil in accordance with claim 1 wherein the polyethoxylated 2,4-dinonyl phenol contains from 8 to 11 ethoxylated units.

14. A mosquito control oil in accordance with claim 13 wherein the polyethoxylated 2,4-dinonyl phenol is present in a concentration from about 0.2 weight percent to about 1.0 weight percent.

15. A mosquito control oil in accordance with claim 13 wherein the polyethoxylated 2,4-dinonyl phenol is present in a concentration of about 0.75 weight percent.

16. A mosquito control oil in accordance with claim 1 wherein the polyethoxylated 2,4-dinonyl phenol contains about 8 ethoxy units.

17. A mosquito control oil in accordance with claim 16 wherein the polyethoxylated 2,4-dinonyl phenol is present in a concentration from about 0.2 weight percent to about 1.0 weight percent.

18. A mosquito control oil in accordance with claim 16 wherein the polyethoxylated 2,4-dinonyl phenol is present in a concentration from about 0.75 weight percent.

19. A mosquito control oil in accordance with claim 1 wherein the hydrocarbon oil boils substantially within the range from about 500° F. to about 600° F. and the polyethoxylated 2,4-dinonyl phenol is present in a concentration of about 0.75 weight percent.

20. A mosquito control oil in accordance with claim 19 wherein the polyethoxylated 2,4-dinonyl phenol contains about 8 ethoxy units.

21. A mosquito control oil in accordance with claim 20 wherein the hydrocarbon oil has the following characteristics:

Viscosity—50 SSU at 100° F.
Aromatic content—12 volume percent
API gravity—31.5
ASTM D–86—IBP–508° F.
5%—535° F.
50%—572° F.
95%—599° F.
FBP—609° F.

22. A method of killing immature mosquitoes which comprises
    applying to the surface of a mosquito breeding pond at a rate of at least 0.5 gallon per acre of exposed pond surface
a mosquito control oil consisting essentially of:
    (a) a hydrocarbon oil boiling substantially within the range from 500° F. to 800° F. and having a midpoint no greater than 650° F., containing at least 60% saturated hydrocarbons, and having a toxicity toward immature mosquitoes, and
    (b) from about 0.2 weight percent to about 3.75 weight percent concentration of polyethoxylated 2,4-dinonyl phenol which contains an average of from about 6 to about 14 ethoxy units in the ethoxylated substituent.

23. A method according to claim 22 wherein the oil is a paraffinic oil having a boiling range from about 500° F. to about 600° F., a viscosity of about 50 SSU at 100° F. and an aromatic content of about 12 volume percent, and an API gravity of about 31.5.

24. A method in accordance with claim 23 wherein the application rate is from about 0.5 gallon to about 2.5 gallons per acre.

25. A method in accordance with claim 23 wherein the polyethoxylated 2,4-dinonyl phenol contains about 8 ethoxy units and is present in a concentration of about 0.75 weight percent.

References Cited

UNITED STATES PATENTS

| | | | |
|---|---|---|---|
| 2,105,856 | 1/1938 | Coleman et al. | 196—149 |
| 3,100,230 | 8/1963 | Mansfield | 260—613 |

OTHER REFERENCES

Chemical Abstracts, vol. 41.
Yearbook of Agriculture, U.S. Dept. of Agriculture, 1952, pp. 481, 482.
American Petroleum Refining, H. S. Bell, Van Nostrand Co., New York, 1959, p. 15.

FRANK CACCIAPAGLIA, JR., Primary Examiner
J. V. COSTIGAN, Assistant Examiner

U.S. Cl. X.R.
424—355, 356